US008843823B2

(12) United States Patent
Hase et al.

(10) Patent No.: US 8,843,823 B2
(45) Date of Patent: Sep. 23, 2014

(54) DOCUMENT DISPLAY SYSTEM, DOCUMENT DISPLAY DEVICE, AND COMPUTER-READABLE STORAGE MEDIUM FOR COMPUTER PROGRAM

(75) Inventors: Junichi Hase, Osaka (JP); Hisashi Uchida, Kuze-gun (JP); Daisuke Nakano, Kobe (JP); Ayumi Itoh, Takarazuka (JP); Tomoaki Nakajima, Kobe (JP)

(73) Assignee: Konica Minolta, Inc., Tokyo (JP)

( * ) Notice: Subject to any disclaimer, the term of this patent is extended or adjusted under 35 U.S.C. 154(b) by 83 days.

(21) Appl. No.: 13/416,836

(22) Filed: Mar. 9, 2012

(65) Prior Publication Data

US 2012/0240040 A1 Sep. 20, 2012

(30) Foreign Application Priority Data

Mar. 16, 2011 (JP) .................................. 2011-057389

(51) Int. Cl.
*G06F 17/22* (2006.01)
*G06F 17/21* (2006.01)
*G06F 17/30* (2006.01)

(52) U.S. Cl.
CPC ........ *G06F 17/212* (2013.01); *G06F 17/30905* (2013.01)
USPC ............ 715/273; 715/234; 715/255; 715/788

(58) Field of Classification Search
USPC ......... 715/200, 201, 204, 205, 234, 243, 253, 715/255, 256, 273, 274, 760, 788
See application file for complete search history.

(56) References Cited

U.S. PATENT DOCUMENTS 8,164,765 B2 * 4/2012 Anno et al. ................... 358/1.13
8,582,177 B2 * 11/2013 Nitta .............................. 358/1.9
2006/0279780 A1 * 12/2006 Anno et al. ................... 358/1.15
2007/0219981 A1 9/2007 Takaai et al.
2010/0039664 A1 * 2/2010 Funakawa ..................... 358/1.15
2010/0149590 A1 * 6/2010 Nishiyama et al. .......... 358/1.15
2010/0188679 A1 * 7/2010 Nakagawa .................... 358/1.12

(Continued)

FOREIGN PATENT DOCUMENTS

| CN | 101841619 A | 9/2010 |
| JP | 2001-243216 | 9/2001 |
| JP | 2007-235744 | 9/2007 |
| JP | 2008-146245 | 6/2008 |

OTHER PUBLICATIONS

Tanaka, Hikari. (May 10, 2007). "Exchanging office document with person who does not have Microsoft Office," *Mac & Windows Super Practical Combined Use Techniques* 1:34.

(Continued)

*Primary Examiner* — Maikhanh Nguyen
(74) *Attorney, Agent, or Firm* — Osha Liang LLP

(57) ABSTRACT

A document display system is provided which includes a first document display device, and a second document display device. The first document display device includes a display processing portion configured to display an electronic document, a settings update portion configured to update display settings information indicating latest display settings in response to operation for modifying settings by a user during a period in which the electronic document is displayed, and a document transmission portion configured to send out the electronic document and the display settings information. The second document display device includes a document obtaining portion configured to obtain the electronic document and the display settings information sent out from the first document display device, and a display setting portion configured to incorporate settings for display settings indicated in the display settings information into display settings to be applied at a start of display of the electronic document.

15 Claims, 12 Drawing Sheets

(56) References Cited

U.S. PATENT DOCUMENTS

2010/0239171 A1    9/2010  Ohta
2011/0273738 A1*  11/2011  Tanaka et al. ............... 358/1.14

OTHER PUBLICATIONS

JustSystems Corporation. (Feb. 9, 2007) "Compatibility from Microsoft Words to Ichitaro," located at <http://www.support.justsystems.com/faq/1032/app/servlet/gadoc?Q . . . > visited on Feb. 28, 2013. (13 pages).

Notification of Reasons for Refusal mailed Mar. 12, 2013, directed to Japanese Patent Application No. 2011-057389; 7 pages.

Decision to Grant a Patent mailed Aug. 27, 2013, directed to JP Application No. 2011-057389; 6 pages.

Office Action issued in counterpart Chinese application No. 201210070898.0 mailed Feb. 28, 2014 (15 pages).

\* cited by examiner

| ITEM TYPE | | BROWSING TICKET (DISPLAY SETTINGS INFORMATION) | | |
|---|---|---|---|---|
| | | DISPLAY SETTINGS ITEM | LATEST SETTINGS | [CANDIDATES FOR SETTING] |
| COMMON ITEMS (20) | | DISPLAY PAGE NUMBER | ALL | [ALL, ANY SELECTED NUMBER] |
| | | PAGE DISPLAY ORDER | ASCENDING ORDER | [ASCENDING ORDER, DESCENDING ORDER, ANY ORDER] |
| | | MULTI-PAGE SPREAD | NO | [NO, PREDETERMINED NUMBER (2, 4, 6, 9, 16,...) ] |
| | | ... | ... | |
| PARTICULAR ITEMS (21) | 《DEVICE A》 : SMARTPHONE | | | |
| | | DISPLAY MODE | NORMAL DISPLAY | [NORMAL DISPLAY, FULL-SCREEN DISPLAY] |
| | | MAGNIFICATION | 200% | [VALUE WITHIN RANGE OF 100-400%] |
| | | SHIFT DISPLAY | (20, 30) | [NO, COORDINATES OF STARTING POINT (x, y) ] |
| | | SPLIT-SCREEN | NO | [NO, DUAL-SPLIT] |
| | | SCREEN ORIENTATION | VERTICAL | [VERTICAL (PORTRAIT), HORIZONTAL (LANDSCAPE) ] |
| | | ... | ... | |

| ITEM TYPE | | BROWSING TICKET (DISPLAY SETTINGS INFORMATION) | | |
|---|---|---|---|---|
| | | DISPLAY SETTINGS ITEM | LATEST SETTINGS | [CANDIDATES FOR SETTING] |
| 20 { | COMMON ITEMS | DISPLAY PAGE NUMBER | ALL | [ALL, ANY SELECTED NUMBER] |
| | | PAGE DISPLAY ORDER | ASCENDING ORDER | [ASCENDING ORDER, DESCENDING ORDER, ANY ORDER] |
| | | MULTI-PAGE SPREAD | NO | [NO, PREDETERMINED NUMBER (2, 4, 6, 9, 16,...)] |
| | | ... | ... | |
| 21 { | PARTICULAR ITEMS | 《DEVICE A》 : SMARTPHONE | | |
| | | DISPLAY MODE | NORMAL DISPLAY | [NORMAL DISPLAY, FULL-SCREEN DISPLAY] |
| | | MAGNIFICATION | 200% | [VALUE WITHIN RANGE OF 100-400%] |
| | | SHIFT DISPLAY | (20, 30) | [NO, COORDINATES OF STARTING POINT (x, y)] |
| | | | ... | |
| 22 { | PARTICULAR ITEMS | 《DEVICE B》 : TABLET COMPUTER | | |
| | | DISPLAY MODE | FULL-SCREEN DISPLAY | [NORMAL DISPLAY, FULL-SCREEN DISPLAY] |
| | | SCALING FACTOR FOR DISPLAY | 100% | [VALUE WITHIN RANGE OF 50-800%] |
| | | SPLIT-SCREEN | NO | [NO, VERTICAL-SPLIT, HORIZONTAL-SPLIT] |
| | | SCREEN ORIENTATION | HORIZONTAL | [VERTICAL (PORTRAIT), HORIZONTAL (LANDSCAPE)] |
| | | ... | ... | |

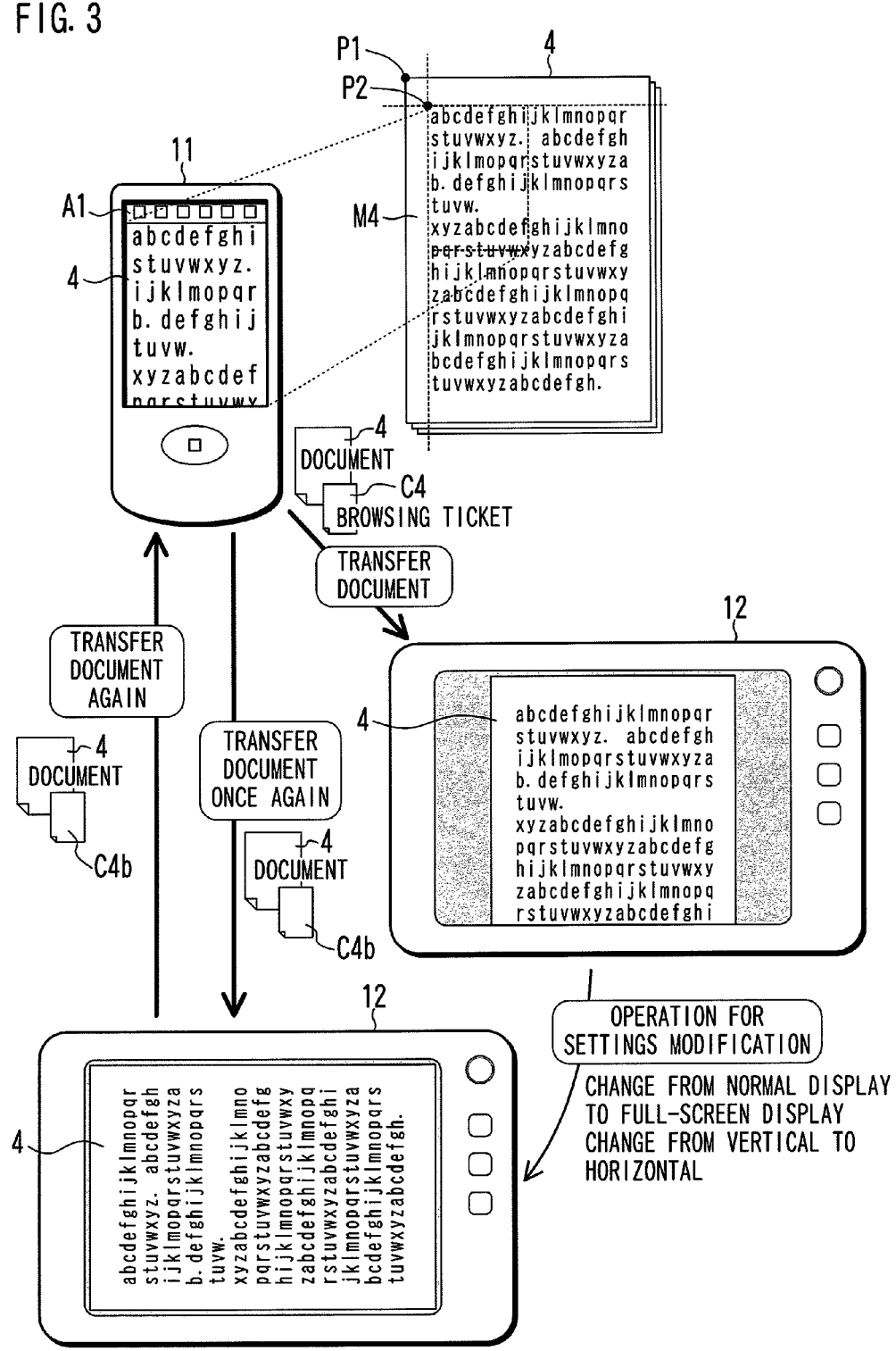

| ITEM TYPE | | BROWSING TICKET (DISPLAY SETTINGS INFORMATION) | | |
|---|---|---|---|---|
| | | DISPLAY SETTINGS ITEM | CURRENT SETTINGS | [CANDIDATES FOR SETTING] |
| COMMON ITEMS | | DISPLAY PAGE NUMBER | 1, 3, 5-10, 15- | [ALL, ANY SELECTED NUMBER] |
| | | PAGE DISPLAY ORDER | ASCENDING ORDER | [ASCENDING ORDER, DESCENDING ORDER, ANY ORDER] |
| | | MULTI-PAGE SPREAD | 2 | [NO, PREDETERMINED NUMBER (2, 4, 6, 9, 16,...)] |
| | | FONT REPLACE | YES | [YES, NO] |
| | | LETTER SIZE OPTIMIZATION | YES | [YES, NO] |
| | | ... | ... | |
| PARTICULAR ITEMS | | 《DEVICE A》: MFP | | |
| | | DISPLAY MODE | FULL-SCREEN DISPLAY | [NORMAL DISPLAY, FULL-SCREEN DISPLAY] |
| | | MAGNIFICATION | 200% | [ANY VALUE WITHIN PREDETERMINED RANGE] |
| | | SHIFT DISPLAY | (20, 30) | [NO, COORDINATES OF STARTING POINT (x, y)] |
| | | DISPLAY FONT | MING-STYLE TYPEFACE | [PREDEFINED FONT, ANY FONT] |
| | | SPLIT-SCREEN | NO | [NO, DUAL-SPLIT] |
| | | SCREEN ORIENTATION | VERTICAL | [VERTICAL (PORTRAIT), HORIZONTAL (LANDSCAPE)] |
| | | ... | ... | |

60: COMMON ITEMS
61: PARTICULAR ITEMS

| ITEM TYPE | | PROJECTOR DEFAULT INFORMATION | | |
|---|---|---|---|---|
| | DISPLAY SETTINGS ITEM | DEFAULT SETTINGS | [CANDIDATES FOR SETTING] | |
| COMMON ITEMS (60) | DISPLAY PAGE NUMBER | ALL | [ALL, ANY SELECTED NUMBER] | |
| | PAGE DISPLAY ORDER | ASCENDING ORDER | [ASCENDING ORDER, DESCENDING ORDER, ANY ORDER] | |
| | MULTI-PAGE SPREAD | NO | [NO, PREDETERMINED NUMBER (2, 4, 6, 9, 16...)] | |
| | FONT REPLACE | YES | [YES, NO] | |
| | LETTER SIZE OPTIMIZATION | YES | [YES, NO] | |
| | ... | ... | | |
| PARTICULAR ITEMS (62) | 《DEVICE B》: PROJECTOR | | | |
| | DISPLAY MODE | FULL-SCREEN DISPLAY | | |
| | DISPLAY FONT | GOTHIC | [GOTHIC (STANDARD), ORIGINAL FONT] | |
| | SPLIT-SCREEN | NO | [NO, VERTICAL-SPLIT, HORIZONTAL-SPLIT] | |
| | SCREEN ORIENTATION | HORIZONTAL | [VERTICAL (PORTRAIT), HORIZONTAL (LANDSCAPE)] | |
| | ... | ... | | |

DOCUMENT DISPLAY SYSTEM, DOCUMENT DISPLAY DEVICE, AND COMPUTER-READABLE STORAGE MEDIUM FOR COMPUTER PROGRAM

This application is based on Japanese patent application No. 2011-057389 filed on Mar. 16, 2011, the contents of which are hereby incorporated by reference.

BACKGROUND OF THE INVENTION

1. Field of the Invention

The present invention relates to a document display device for displaying electronic documents, and a document display system including a plurality of such document display devices. Examples of the document display device are a device having a display screen to produce displays, and a device using a screen to show displays. The former device is, for example, a stationary or mobile information processing device, a mobile terminal, and an e-book reader. The latter device is, for example, a projector.

2. Description of the Related Art

It is sometimes a case where one person displays and views the same electronic document in different information devices. For example, a user of an information device sometimes transfers an electronic document that is created by using a personal computer (PC) or obtained from a Web site to a mobile information device such as a smartphone or a tablet PC to carry around with him/her. This enables the user to look at the electronic document, which was seen on the personal computer, (or a copy thereof) by using a mobile information device at any place. If such a mobile information device has a document edit function, the user is able to update the electronic document or add a comment thereto at any place. Further, the user is also able to transfer the electronic document that has been updated by using the mobile information device to the personal computer where the electronic document was or to another information device, and then the user is able to view the updated electronic document in the transfer destination information device.

For viewing an electronic document, a user modifies display settings of an information device appropriately. Display settings items are, for example, screen orientation (vertical/horizontal), scaling factor for display, the number of pages to be displayed concurrently, page scroll sequence, display font, split-screen, and color arrangement on screen. In general, software used to display an electronic document, i.e., viewer software, accepts operation for modifying settings while the electronic document is displayed. The user can modify display settings while viewing the electronic document, and thereby the electronic document is easy to see.

There is known a so-called "save workspace" function for storing display settings modified by a user, i.e., the updated display settings. According to this function, when the user performs operation for finishing browsing, display settings at this point in time and the position of the view within the electronic document are stored. When the electronic document is opened later, the preceding display state of the electronic document is reproduced. However, display settings for all the items are not stored in association with the electronic document. Assume that, for example, after looking at a first electronic document, the user views a second electronic document, and modifies display settings for a specific item (settings item common to any document) while viewing the second electronic document. In such a case, when the user views the first electronic document again later, with respect to the specific item, display settings made on the second electronic document are applied to the first electronic document. In short, the display state under which the first electronic document was viewed previously is not reproduced.

In the meantime, as for a display of the same electronic document in different information devices, an information sharing system is proposed by which users of mobile terminals share information added to the electronic document (Japanese Laid-open Patent Publication No. 2008-146245). According to the information sharing system, when a user of a mobile terminal modifies a document page, for example, by adding an underline or a handwritten character thereto, additional information indicating the modification is sent to a management device from which the additional information is delivered to the other mobile terminals. This enables all the users to use the individual mobile terminals to look at an electronic document to which one of the users adds the underline or the handwritten character.

In the case where one person uses a first information device to look at an electronic document, and then, he/she uses a second information device to view the same electronic document as being looked at, it is troublesome for him/her to make display settings in the second information device in a similar manner as made to the first information device for easy viewing. In particular, a person who sees many different kinds of electronic documents, he/she is required to make display settings possibly every time electronic documents to be looked at are changed from one to another. It is labor-intensive and time-consuming. In conventional technologies, even if the first information device is equal to the second information device in model, only a part of display settings items in the first information device is incorporated into the second information device, and the other display settings items are not incorporated thereinto. If the first and second information devices significantly differ from each other in display function depending on the display resolution and the viewer specifications, the display settings applied to one of the devices sometimes cannot be applied to the other just as they are. Even in such a case, however, the small number of display settings items to be modified does not put, to a user, a large amount of work for setting operation.

SUMMARY

The present disclosure is directed to solve the problems pointed out above, and therefore, an object of an embodiment of the present invention is to reduce the workload required for display settings operation performed by a user who uses different display devices to view an electronic document.

According to embodiments of the present invention, a document display system including a first document display device, and a second document display device is provided. The first document display device includes a display processing portion configured to display an electronic document in accordance with display settings for a common item and a particular item, the common item being a predetermined item of a display setting item common to the first document display device and the second document display device, the particular item being a display setting item for the first document display device except the common item, a settings update portion configured to update display settings information indicating latest display settings in response to operation for modifying settings by a user during a period in which the electronic document is displayed, and a document transmission portion configured to, in response to a command to externally send out the electronic document, send out the electronic document and the display settings information. The second document display device includes a document obtaining portion configured to obtain the electronic document and the display settings information sent out from the first document display device, and a display setting portion configured to incorporate settings for the common item among display settings indicated in the display settings information into display settings to be applied at a start of display of the electronic document.

These and other characteristics and objects of the present invention will become more apparent by the following descriptions of preferred embodiments with reference to drawings.

BRIEF DESCRIPTION OF THE DRAWINGS

FIGS. 2A and 2B are diagrams showing a first example of a browsing ticket attached to an electronic document.

FIG. 3 is a diagram showing an example as to how documents are displayed in accordance with browsing tickets in first and second document display devices.

FIG. 8 is a diagram showing a second example of a browsing ticket attached to an electronic document.

FIG. 9 is a diagram showing an example of default information indicating display settings in a document display device.

DESCRIPTION OF THE PREFERRED EMBODIMENTS

[First Embodiment]

Figure 1:
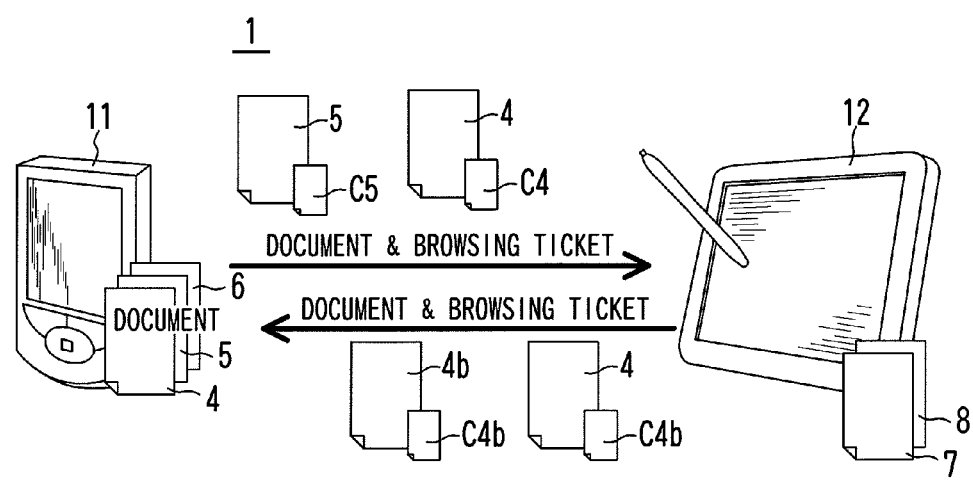
FIG. 1 is a diagram showing a first example of the hardware configuration of a document display system.

FIG. 1 shows a document display system 1. The document display system 1 is configured of a smartphone 11 serving as a first document display device and a tablet personal computer (hereinafter, referred to as a tablet computer) 12 serving as a second document display device. Each of the smartphone 11 and the tablet computer 12 is capable of displaying electronic documents (each referred to as a "document" in the drawings) 4, 4b, 5, 6, 7, and 8 having file formats defined in accordance with the specifications of each of the smartphone 11 and the tablet computer 12. The smartphone 11 is capable of transferring the electronic documents 4, 4b, 5, 6, 7, and 8 to the tablet computer 12 and vice versa. Examples of the transfer method are a method with the use of a wireless Local Area Network (LAN) complying with IEEE 802.11b/g, a method with the use of Bluetooth, a method through infrared data communication, and a method in which a document is attached to an e-mail message and the e-mail message is conveyed through a mail server.

For the transfer of an electronic document in the document display system 1, a browsing ticket is added to the electronic document. The browsing ticket indicates display settings applied at a time when the electronic document to be transferred is displayed most recently in a device from which the electronic document is to be transferred, i.e., a transmission source device. Such a browsing ticket is created for each electronic document, and is added to the corresponding electronic document. In the illustrated example of FIG. 1, browsing tickets C4 and C5 are added respectively to electronic documents 4 and 5 to be transferred from the smartphone 11 to the tablet computer 12. A browsing ticket C4b is added each to electronic documents 4 and 4b to be transferred from the tablet computer 12 to the smartphone 11. When the electronic documents 4, 5, and 4b are displayed in the transfer destination devices, display settings indicated in the corresponding browsing tickets C4, C5, and C4b are reflected as much as possible in display settings in the transfer destination devices. In short, the display settings in the transfer destination device are automatically modified in a manner to be the same as or close to the display settings in the transfer source device.

Display settings are modified based on a browsing ticket added to each electronic document. Accordingly, if a user modifies display settings to view an electronic document A, and after that, he/she views another electronic document B, display settings that were applied to look at the electronic document B previously are reflected in the current display of the electronic document B.

Such a function to incorporate display settings indicated in a browsing ticket into a screen display is useful, for example, when one user uses the smartphone 11 and the tablet computer 12 selectively depending on the place and situation. The function saves the user from having to manually optimize display settings every time he/she switches between devices used for browsing an electronic document. The document display system 1 is also useful in a case where different users use the smartphone 11 and the tablet computer 12. For example, the document display system 1 is useful in a situation where a user of the smartphone 11 would like a user of the tablet computer 12 to look at an electronic document in the same display settings as those in the smartphone 11.

Detailed descriptions are provided below of the configuration of the document display system 1.

The browsing ticket C4 shown in FIG. 2A corresponds to an electronic document 4 transferred from the smartphone 11 to the tablet computer 12 as discussed above. The browsing ticket C4b shown in FIG. 2B corresponds to electronic documents 4 and 4b each transferred from the tablet computer 12 to the smartphone 11 as discussed above. The electronic document 4b is an edited version of the electronic document 4. The edit is, for example, addition of a word or image, deletion thereof, addition of an underline, and highlighting. In this description, the following situations are assumed: a situation where the electronic document 4b obtained by updating the electronic document 4 is sent back to the smartphone 11 that is the transmission source device of the electronic document 4; and a situation where the electronic document 4 is repeatedly sent and received between the smartphone 11 and the tablet computer 12 without adding any modifications to the content of the electronic document 4.

Referring to FIG. 2A, the browsing ticket C4 contains display settings items which are classified into common items 20 and particular items 21. The browsing ticket C4 indicates "the latest settings" of each of the display settings items. The latest settings mean display settings designated by the user most recently during a period in which an electronic document (electronic document 4 herein) corresponding to a browsing ticket of interest (browsing ticket C4 herein) is displayed. If the user does not modify the settings during the display period, then the settings applied at the beginning of the display of the electronic document are regarded as the latest settings. If the user modifies the settings during the display period, then the post-modification settings are regarded as the latest settings. If the electronic document is currently displayed, then the current settings are regarded as the latest settings. If the electronic document was previously displayed, then the settings applied at the end of the display of the electronic document are regarded as the latest settings.

The common items 20 are, among display settings items common to the smartphone 11 and the tablet computer 12 both of which are the document display devices of the document display system 1, display settings items which are defined not to be unique to any of the smartphone 11 and the tablet computer 12. In the illustrated example, the common items 20 include "display page number", "page display order", and "multi-page spread". The "display page number" is an item to determine a display target page in an electronic document having a plurality of pages. The "page display order" is an item to determine in which order the pages of the document are displayed. The "multi-page spread" is an item to determine whether a plurality of pages are to be displayed on a screen instead of only one page.

The particular items 21 are display settings items, except the common items 20, in the smartphone 11 identified as a device A. In the illustrated example, the particular items 21 include "display mode", "magnification" "shift display", "split-screen", and "screen orientation". The "display mode" is an item to determine a normal display in which a part of a screen is allocated to specific areas such as a menu bar and a status display region, or, alternatively, an entire screen display (full-screen display) in which the entire screen is used to display the contents of a document. The "magnification" is an item to determine a scaling factor for display. The "shift display" item enables effective use of a screen, and is to determine whether or not a page is positioned on the screen in such a manner that page margins are invisible on the screen. The "split-screen" is an item to determine whether or not an electronic document is displayed separately in regions obtained by splitting the display region on a screen. The "screen orientation" is an item to determine whether a rectangular page is displayed vertically (in portrait mode) or horizontally (in landscape mode).

Referring to FIG. 2B, the browsing ticket C4b contains display settings items which are classified into common items 20, particular items 21, and particular items 22. The browsing ticket C4b indicates "the latest settings" of each of the display settings items. The common items 20 and the particular items 21 are the same as those of the browsing ticket C4 shown in FIG. 2A. The particular items 22 are display settings items, except the common items 20, in the tablet computer 12 identified as a device B. In short, the browsing ticket C4b is display settings information corresponding to the browsing ticket C4 plus data indicating the latest settings for the particular items 22.

In the illustrated example, the particular items 22 include "display mode", "scaling factor for display", "split-screen", and "screen orientation". The "scaling factor for display" is an item to make settings as with the case of "magnification" of the particular items 21. The other three items (display mode, split-screen, and screen orientation) are items to make the same settings as the items having the same name in the particular items 21. Note, however, that candidates for setting (options for setting) in "scaling factor for display" and "split-screen" of the particular items 22 for the tablet computer 12 are not equal to those in "magnification" and "split-screen" of the particular items 21 for the smartphone 11. This is because the tablet computer 12 and the smartphone 11 differ from each other in display function.

As is clear from the comparison between the particular items 21 and the particular items 22 of FIGS. 2A and 2B, options for settings in "display mode" and "screen orientation" are the same between the particular items 21 and the particular items 22. Stated differently, it can be said that "display mode" and "screen orientation" are display settings items common to the smartphone 11 and the tablet computer 12. In the document display system 1 according to this embodiment, however, it is assumed that each of the smartphone 11 and the tablet computer 12 sends and receives an electronic document with a different document display device. Then, in consideration of a case where the different document display device does not have a full-screen display function or a function to switch between screen orientations, "display mode" and "screen orientation" are included in the particular items 21 and 22.

FIG. 3 shows display examples corresponding to the browsing tickets C4 and C4b. The smartphone 11 shown in the upper part of FIG. 3 displays one page of a vertical electronic document 4. The display mode is the normal display mode in which an upper end of the screen is allocated to a particular region A1 for operation. Further, the shift display is applied in the smartphone 11 in such a manner that not a left-corner point P1 but an inner point P2 is deemed as the starting point of the display to make the page margin M4 invisible on the screen. Together with the browsing ticket C4 for specifying such display settings, the electronic document 4 is transferred to the tablet computer 12 shown in the middle part of FIG. 3. The electronic document 4 is then displayed on the horizontal screen of the tablet computer 12.

Figure 4:
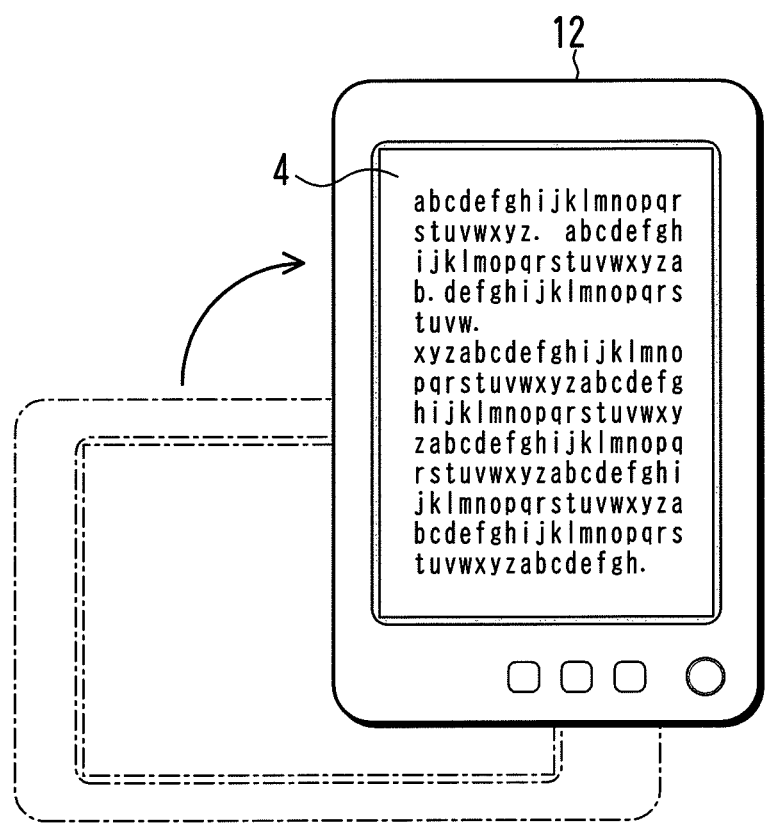
FIG. 4 is a schematic diagram showing in what way the posture of a document display device is changed to correspond to the orientation of a document displayed.

It is assumed that, at a time when the electronic document 4 is transferred, display settings of the tablet computer 12 show the normal display as the display mode and the vertical orientation as the screen orientation. In such a case, at the start of display of the electronic document 4, as for the common items 20, the settings indicated in the browsing ticket C4 are applied. The browsing ticket C4, however, does not contain setting information for the particular items 22 of the tablet computer 12. Accordingly, default settings in the tablet computer 12 are applied for the particular items 22. It is assumed that, for example, a user views the display on the tablet computer 12 shown in the middle part of FIG. 3, changes the settings for display mode from normal display to full-screen display, and also changes settings for screen orientation from vertical to horizontal. In such a case, as shown in the lower part of FIG. 3, the tablet computer 12 displays the electronic document 4 not vertically but horizontally with entire region of the screen of the tablet computer 12. At this time, the user can rotate the tablet computer 12 by 90 degrees as shown in FIG. 4 to make it easy for him/her to look at the electronic document 4. Instead of the browsing ticket C4, the browsing ticket C4b is added to the electronic document 4 displayed on the tablet computer 12.

The tablet computer 12, then, transfers the electronic document 4 to which the browsing ticket C4b is added to the smartphone 11. When the electronic document 4 is displayed on the smartphone 11, settings specified in the common items 20 of the browsing ticket C4b and in the particular items 21 for the smartphone 11 are applied. In other words, the display settings applied at a time when the user of the smartphone 11 viewed the electronic document 4 previously are reproduced.

Thereafter, when the smartphone 11 sends the electronic document 4 again to the tablet computer 12, and the electronic document 4 is displayed on the tablet computer 12, or, alternatively, when the electronic document 4 stored in the tablet computer 12 is displayed on the tablet computer 12, settings specified in the common items 20 of the browsing ticket C4b and in the particular items 22 for the tablet computer 12 are applied. In other words, the display settings applied at the time when the user of the tablet computer 12 viewed the electronic document 4 previously are reproduced.

Figure 5:
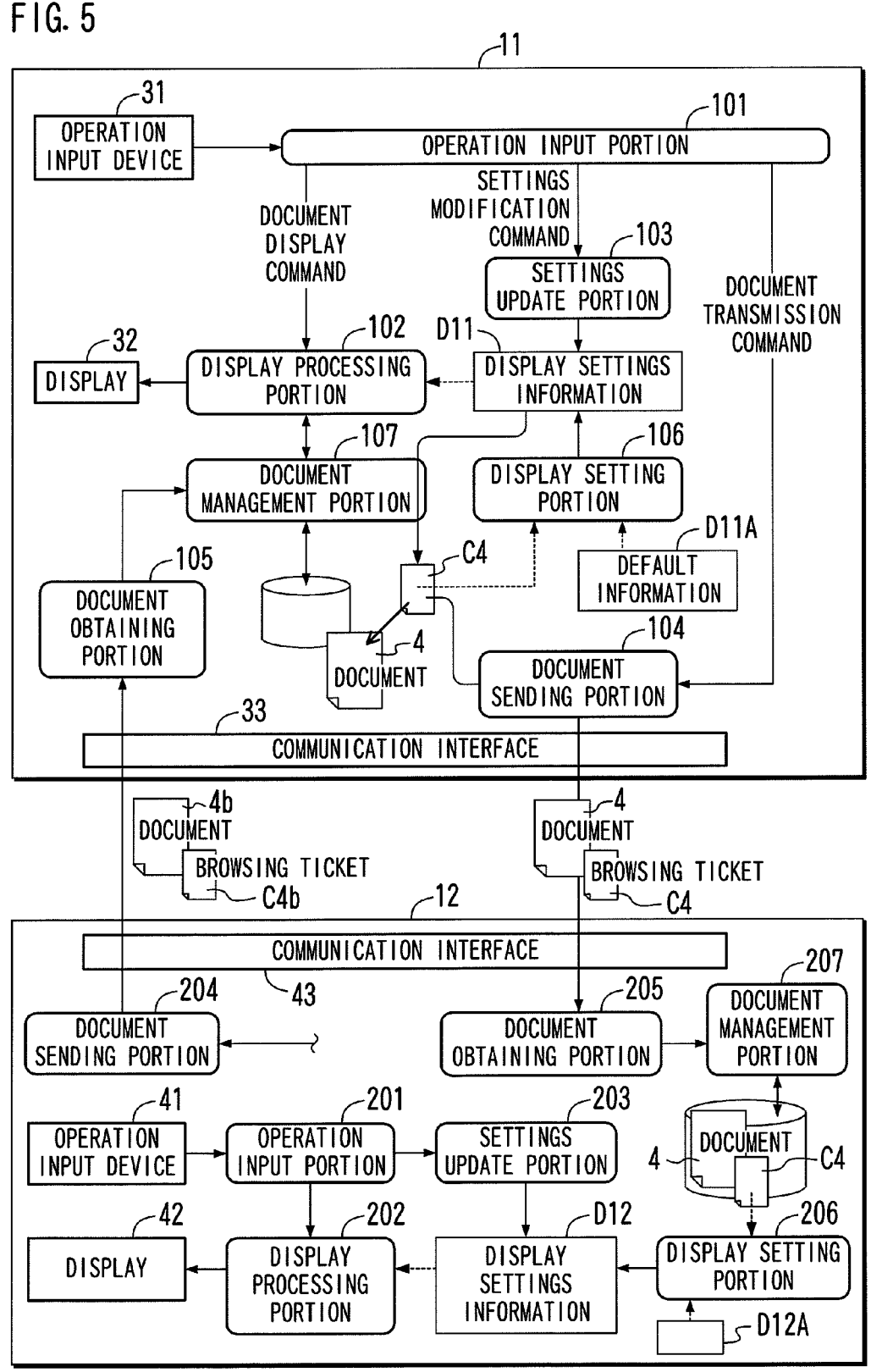
FIG. 5 is a diagram showing an example of the functional configurations of first and second document display devices.

FIG. 5 is a diagram showing an example of the functional configuration of the smartphone 11 and the tablet computer 12.

The smartphone 11 is configured of functional elements such as an operation input portion 101, a display processing portion 102, a settings update portion 103, a document sending portion 104, a document obtaining portion 105, a display setting portion 106, and a document management portion 107. A central processing unit (CPU) serving as a computer of the smartphone 11 executes a predetermined computer program, and thereby the functional elements are implemented.

The operation input portion 101 serves to analyze the details of user operation based on a signal inputted from an operation input device 31 having an operation key and a touchscreen, and conveys a command given by the user to an appropriate destination. A document display command accompanied by designation of an electronic document to be displayed is sent to the display processing portion 102. A display settings modification command during displaying an electronic document is sent to the settings update portion 103. A command to externally deliver an electronic document is sent to the document sending portion 104.

The display processing portion 102 serves to display, on a screen of a display 32, the electronic document selected as the display target by the user in accordance with the latest display settings specified in the common items 20 and the particular items 21 indicated in display settings information D11. The display processing portion 102 obtains data on the display target electronic document from the document management portion 107, creates a screen where data are laid out in accordance with the display settings, and sends the resultant to the display 32. The display processing portion 102 is also operable to switch between screens in response to page scroll operation. The display settings information D11 is present in a work area for program execution. Every time the user gives a command to modify the display settings, the settings update portion 103 updates the display settings information D11 accordingly. The display settings information D11 is saved onto a non-volatile memory appropriately, so that the latest settings are stored.

In response to the document delivery command from the operation input portion 101, the document sending portion 104 sends out, through a communication interface 33, the electronic document (electronic document 4 herein) designated as the transmission target to a transmission destination device designated by the user. The transmission destination device is any external device having a communication function, and is, for example, a mail server in the case of using e-mail message transmission. In the illustrated example of FIG. 5, the transmission destination device is the tablet computer 12. The communication interface 33 is configured of hardware and software enabling different types of communication such as wireless LAN communication and infrared data communication. If the transmission target electronic document 4 was previously displayed or is currently displayed on the smartphone 11, then the document sending portion 104 sends, together with the electronic document 4, the browsing ticket C4 indicating information on the latest display settings of the electronic document 4. Since the electronic document 4 that was displayed before the transmission command is given is associated with the browsing ticket C4 as additional information by the document management portion 107, the document sending portion 104 receives the electronic document 4 and the browsing ticket C4 added thereto from the document management portion 107, and sends out the same.

The document obtaining portion 105 obtains an electronic document (electronic document 4b in FIG. 5) sent out by an external device and the browsing ticket C4b added to the electronic document 4b through communication via the communication interface 33. The electronic document 4b and the browsing ticket C4b obtained by the document obtaining portion 105 are conveyed to the document management portion 107, and are saved to a predetermined memory area such as a save folder or temporary storage folder for display in accordance with designation made by the user.

The display setting portion 106 determines display settings information D11 to be applied at the start of display of the electronic document. If the electronic document 4 designated, as the display target this time, by the user has never been displayed in the document display system 1, and if no browsing ticket C4 is added to the electronic document 4, then the display setting portion 106 uses, as the display settings information D11, default information D11A stored in a non-volatile memory. Alternatively, if the electronic document 4 designated as the display target this time has never been displayed in the smartphone 11, and if the browsing ticket C4 added to the electronic document 4 does not indicate any settings in the particular items 21, then the display setting portion 106 incorporates the settings specified in the common items 20 of the browsing ticket C4 into the display settings information D11, and incorporates the settings specified in the default information D11A into the particular items 21. Yet alternatively, if the browsing ticket C4 indicates settings in the particular items 21, then the display setting portion 106 incorporates the settings specified in the common items 20 and the particular items 21 of the browsing ticket C4 into the display settings information D11.

The document management portion 107 manages an electronic document kept in the smartphone 11, and, in response to requests from the display processing portion 102 and the document sending portion 104, provides the same with the electronic document. If no browsing ticket C4 is added to the electronic document 4 designated as the display target, then the document management portion 107 creates a browsing ticket C4 indicating the same settings as those of the display settings information D11 that is applied at the beginning of the display and is determined by the display setting portion 106, and associates the created browsing ticket C4 with the electronic document 4. Thereafter, the document management portion 107 updates the details of the browsing ticket C4 appropriately every time the settings update portion 103 updates the display settings information D11. As a result, the settings indicated in the browsing ticket C4 are caused to be consistent with the settings of the corresponding items of the display settings information D11.

As with the functional configuration of the smartphone 11 as discussed above, the functional configuration of the tablet computer 12 is implemented. To be specific, the tablet computer 12 is configured of functional elements such as an operation input portion 201, a display processing portion 202, a settings update portion 203, a document sending portion 204, a document obtaining portion 205, a display setting portion 206, and a document management portion 207. A CPU serving as a computer of the tablet computer 12 executes a predetermined computer program, and thereby the functional elements are implemented. The individual functional elements of the tablet computer 12 operate similarly to the functional elements, having the same name, of the smartphone 11. However, as for the tablet computer 12, the operation input portion 201 analyzes the details of user operation based on an output from an operation input device 41. The display processing portion 202 displays an electronic document on a screen of a display 42 in accordance with settings indicated in display settings information D12. The document sending portion 204 and the document obtaining portion 205 perform communication with the smartphone 11 or another external device through a communication interface 43. The display setting portion 206 determines, based on default information D12A, display settings information D12 to be applied at the start of display if no browsing ticket C4 is added to the display target electronic document 4, or, alternatively, if an added browsing ticket C4 does not contain any settings in the particular items 22.

In the tablet computer 12, if a browsing ticket (browsing ticket C4b, for example) containing settings in the particular items 22 is added to an electronic document designated as the display target, then the settings specified in the common items 20 and the particular items 22 of the browsing ticket are incorporated into display settings to be applied at the beginning of display of the electronic document. In short, the settings indicated in the display settings information D12 are replaced with the settings indicated in the browsing ticket.

As discussed above, the smartphone 11 and the tablet computer 12 are similar to each other in functional configuration. This provides a user using both the smartphone 11 and the tablet computer 12 to view an electronic document having the same content with an environment where display settings are shared between the smartphone 11 and the tablet computer 12, i.e., an environment where a part or the whole of settings for browsing in one of the smartphone 11 and the tablet computer 12 is reflected in display on the other. Further, when an electronic document that was previously viewed is seen by using the same device as used before, the environment under which display settings applied for the previous viewing are reproduced is provided.

Figure 6:
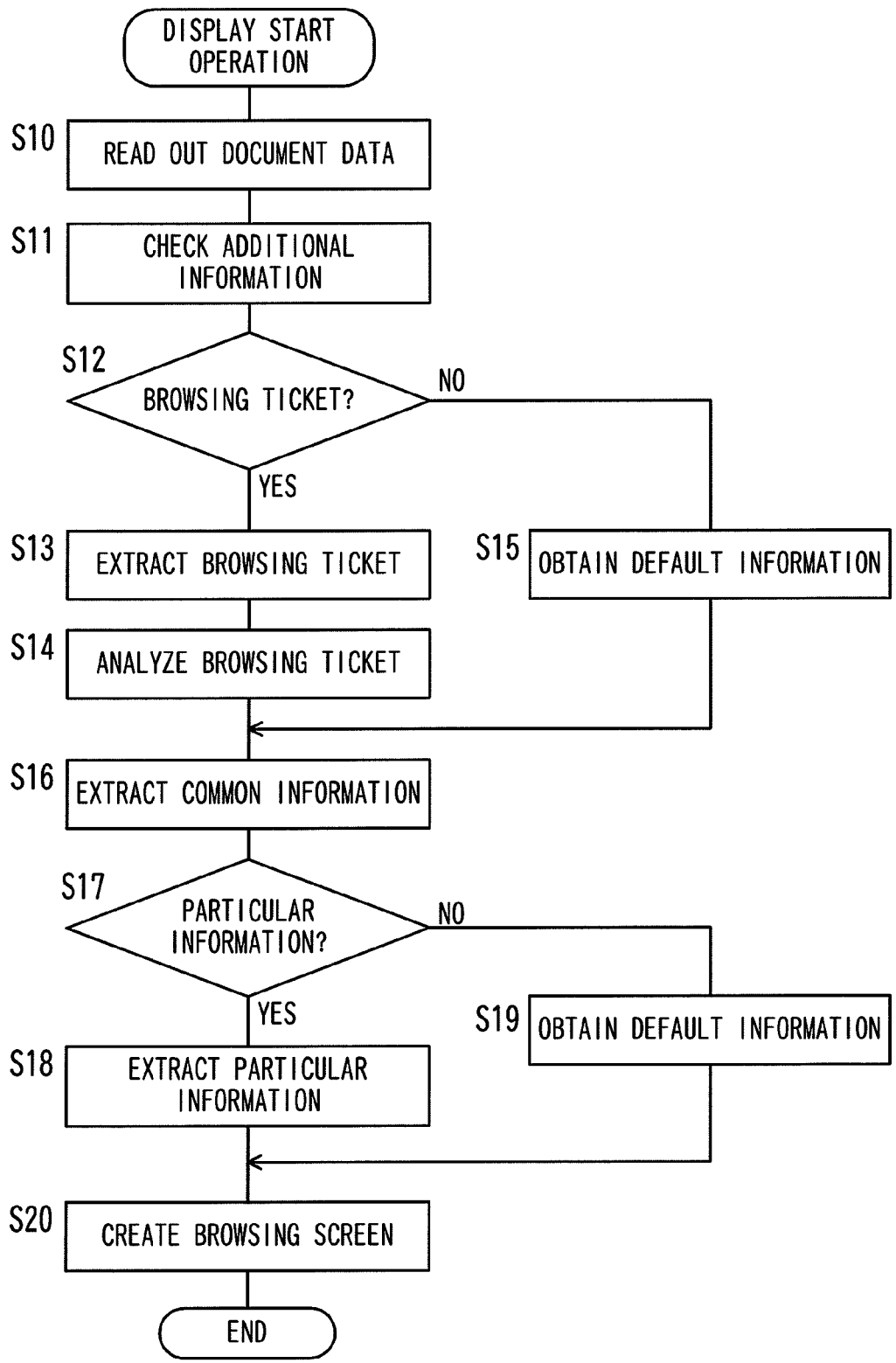
FIG. 6 is a flowchart depicting an outline of the flow of processing to start displaying a document in a document display device.

FIG. 6 is a flowchart depicting an outline of the flow of processing to start displaying an electronic document in each of the smartphone 11 and the tablet computer 12. The document management portion 107, 207 reads out an electronic document to be displayed from a predetermined memory where the electronic document is stored (S10). The document management portion 107, 207 and the display setting portion 106, 206 check information added to the electronic document (S11). If no browsing ticket is present in the additional information (No in S12), then the display setting portion 106, 206 obtains the default information D11A, D12A, and reflects the content thereof in display settings (S15). On the other hand, if a browsing ticket is present (Yes in S12), then the display setting portion 106, 206 extracts the browsing ticket from data provided by the document management portion 107, 207 (S13), analyzes the content of the browsing ticket (S14), extracts common information indicating settings for the common items 20, and reflects the common information in the display settings (S16). Subsequently, the display setting portion 106, 206 extracts particular information indicating the settings in the particular items 21, 22, and reflects the particular information in the display settings (S16 and S17). If no particular information is contained in the browsing ticket (No in S17), then the display setting portion 106, 206 obtains data on the particular items 21, 22 of the default information D11A, D12A, and reflects the obtained data in the display settings (S19). After display settings to be applied at the beginning of display are determined, the display processing portion 102, 202 creates screen data to which the determined display settings are applied, and displays the electronic document on the display 32, 42 (S20).

[Second Embodiment]

Figure 7:
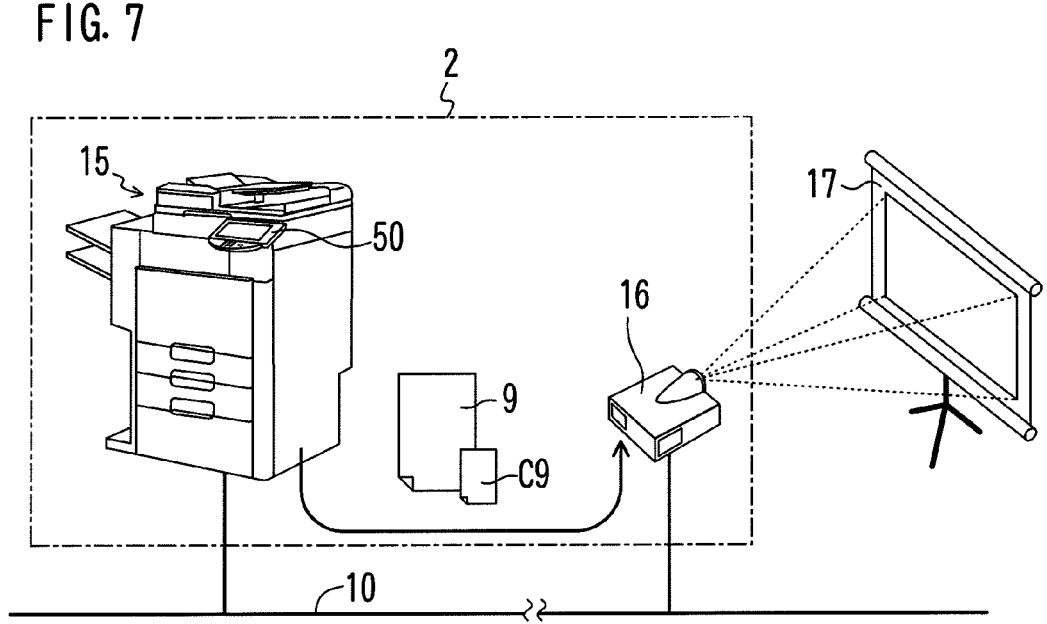
FIG. 7 is a diagram showing a second example of the hardware configuration of a document display system.

FIG. 7 shows a document display system 2. The document display system 2 is configured of a Multi-functional peripheral (MFP) serving as a first document display device and an intelligent projector 16 serving as a second document display device. The MFP 15 and the projector 16 are connected to each other through a LAN 10 so that communication can be performed therebetween. The LAN 10 may be any one of a wired network, a wireless network, and a network provided by combining a wired network and a wireless network.

The MFP 15 is an information device for business use. The MFP 15 is used for copying and network printing both of which are uses of an image forming apparatus, and also used to input, store, and transfer a document. The MFP 15 is provided with an image scanner and a storage, and is capable of saving an electronic document obtained by scanning a document sheet or obtained through network communication with an external device. A user of the MFP 15 is able to view an electronic document obtained by the MFP 15 by displaying the same on a display of an operational panel 50, or to transfer the same to the projector 16. An electronic document 9 displayed on the MFP 15 is associated with a browsing ticket C9 as additional information. When the electronic document 9 is transferred to the projector 16, the browsing ticket C9 is also sent out together with the electronic document 9.

The projector 16 throws a magnified image of the electronic document 9 transferred from the MFP 15 onto a screen 17 larger than the display screen of the MFP 15. At this time, the projector 16 incorporates settings indicated in the browsing ticket C9 added to the electronic document 9 into display settings for the projector 16. As for items not specified in the browsing ticket C9, the projector 16 applies settings indicated in default information prestored therein to settings for display.

Referring to FIG. 8, the browsing ticket C9 contains display settings items which are classified into common items 60 and particular items 61. The browsing ticket C9 indicates "the latest settings" of each of the display settings items. As described earlier, the latest settings mean display settings designated by the user most recently during a period in which an electronic document (electronic document 9 herein) corresponding to a browsing ticket of interest (browsing ticket C9 herein) is displayed.

The common items 60 are, among display settings items common to the MFP 15 and the projector 16 both of which are the document display devices of the document display system 2, display settings items which are defined not to be unique to any of the MFP 15 and the projector 16. In the illustrated example, the common items 60 include "display page number", "page display order", "multi-page spread", "font replace", and "letter size optimization". The "font replace" is an item to determine whether or not to use a font suitable for a device displaying an electronic document instead of the font used in the electronic document. The "letter size optimization" is an item to determine whether or not to change the letter size in the electronic document to a letter size suitable for display.

The particular items 61 are display settings items, except the common items 60, in the MFP 15 identified as a device A. In the illustrated example, the particular items 61 include "display mode", "magnification" "shift display", "display font", "split-screen", and "screen orientation". The "display font" is an item to designate a font to be used for display.

FIG. 9 is a diagram showing an example of default information D16A held in the projector 16. The default information D16A indicates default settings for each of display settings items classified into the common items 60 and particular items 62. The common items 60 of FIG. 9 are the same as the common items 60 of FIG. 8. Since the individual setting items are determined on a device-by-device basis, settings in the common items 60 are different between the case of FIG. 8 and the case of FIG. 9. The particular items 62 are display settings items, except the common items 60, in the projector 16 identified as a device B. Stated differently, the default information D16A indicates default settings for display settings items that may be changed in the projector 16 by the user. In the illustrated example, "display mode", "display font", "split-screen", and "screen orientation" are contained in the particular items 62.

Figure 10:
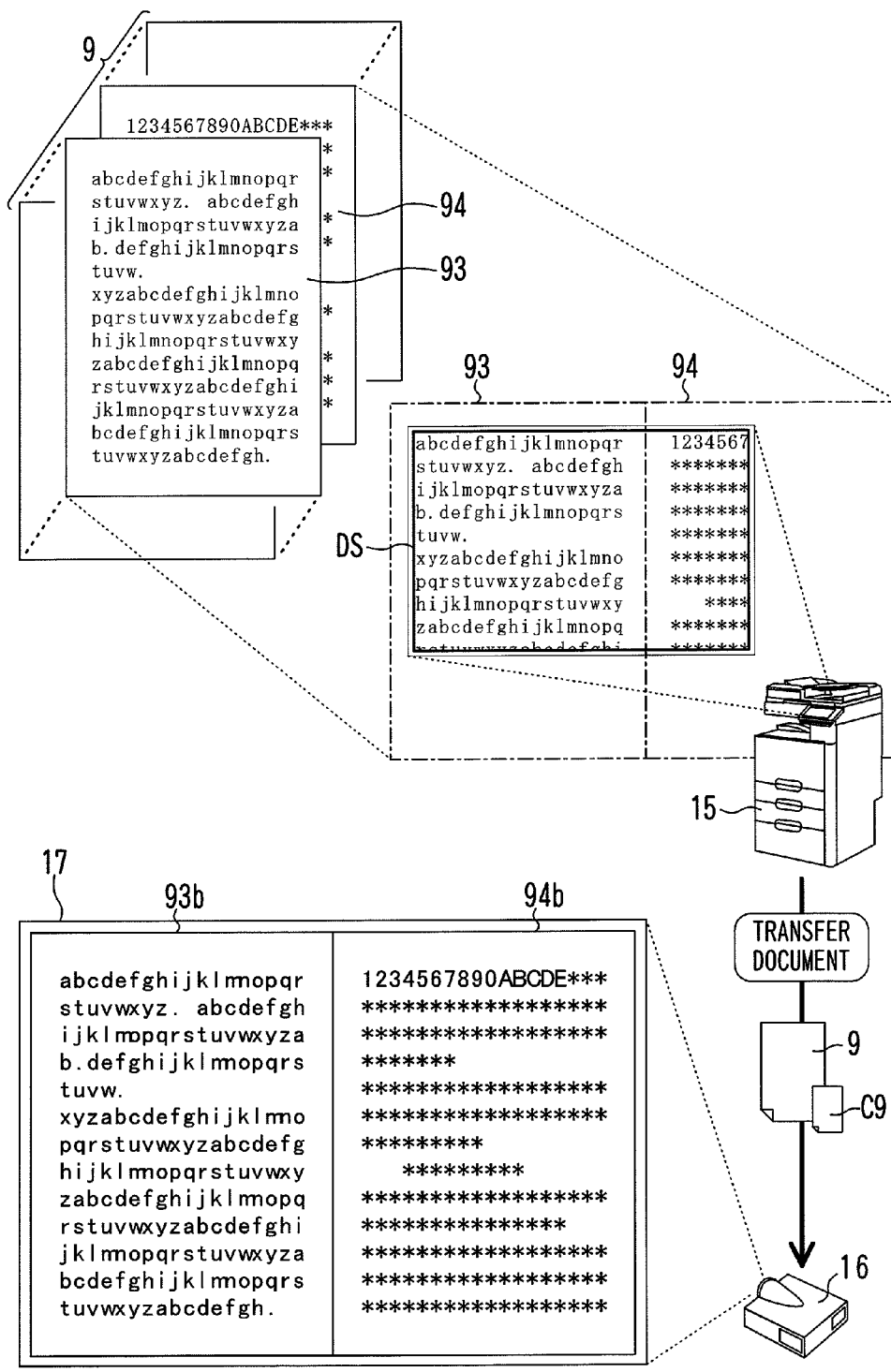
FIG. 10 is a diagram showing another example as to how a document is displayed in accordance with a browsing ticket in first and second document display devices.

FIG. 10 is a diagram showing an example as to how a document is displayed in the document display system 2. An electronic document 9 shown in the upper left of FIG. 10 is a display target. The electronic document 9 has pages 93 and 94 whose page numbers are consecutive. As shown in the right middle of FIG. 10, on a screen DS of the MFP 15, two facing pages 93 and 94 arranged side-by-side denoted by a dot-dash line are enlarged and are partly displayed in the full-screen display mode. Further, the electronic document 9 is subjected to the shift display, and Ming-style typeface font is used therein. The browsing ticket C9 having settings information (see FIG. 8) corresponding to such a display state is transferred to the projector 16 together with the electronic document 9.

As shown in the bottom of FIG. 10, pages 93b and 94b corresponding to the enlarged pages 93 and 94 are displayed on the screen 17. At this time, settings in the common items 60 of the browsing ticket C9 are applied to the display. To be specific, the two pages 93b and 94b are arranged side-by-side as with the display on the MFP 15, and the font replace and the letter size optimization are performed. As to the font replace, since the particular items 61 of the browsing ticket C9 are not items for the projector 16, settings in the item "display font" of the default information D16A (see FIG. 9), i.e., gothic, is used.

Figure 11:
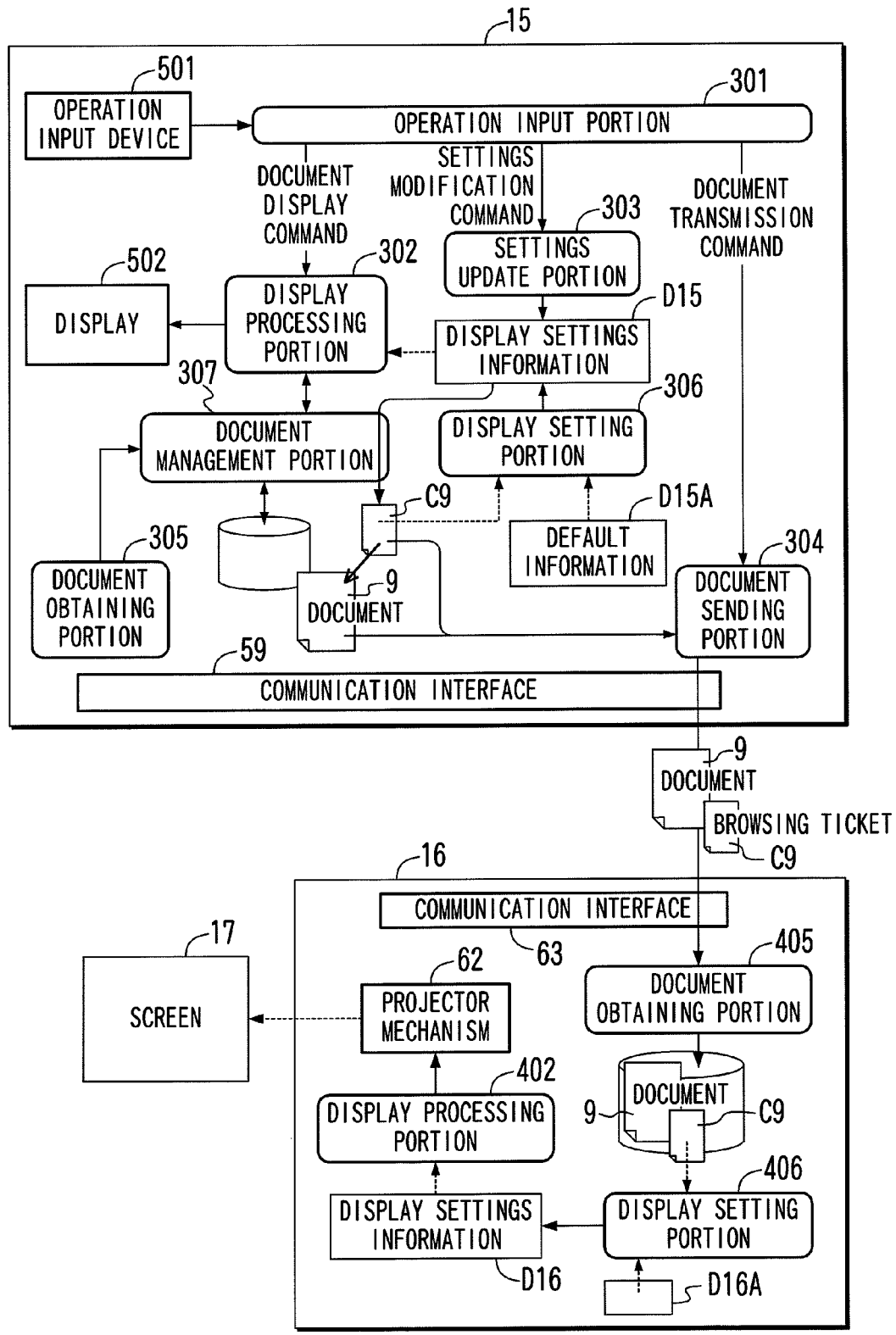
FIG. 11 is a diagram showing another example of the functional configurations of first and second document display devices.

FIG. 11 is a diagram showing an example of the functional configurations of the MFP 15 and the projector 16.

The functional configuration of the MFP 15 is implemented as with the functional configuration of the smartphone 11 as discussed above (see FIG. 5). To be specific, the MFP 15 is configured of functional elements such as an operation input portion 301, a display processing portion 302, a settings update portion 303, a document sending portion 304, a document obtaining portion 305, a display setting portion 306, and a document management portion 307. A CPU serving as a computer of the MFP 15 executes a predetermined computer program, and thereby the functional elements are implemented. The individual functional elements of the MFP 15 operate similarly to the functional elements, having the same name, of the smartphone 11. However, as for the MFP 15, the operation input portion 301 analyzes the details of user operation based on an output from an operation input device 501 of an operating panel, and the display processing portion 302 displays an electronic document on a screen of a display 502 in accordance with settings indicated in display settings information D15. The document sending portion 304 and the document obtaining portion 305 perform communication with the projector 16 or another external device through a communication interface 59. The display setting portion 306 determines, based on the default information D15A, display settings information D15 to be applied at the start of display if no browsing ticket C9 is added to the display target electronic document 9, or, alternatively, if an added browsing ticket C9 does not contain any settings in the particular items 61.

The projector 16 is configured of functional elements such as a display processing portion 402, a document obtaining portion 405, and a display setting portion 406. A CPU serving as a computer of the projector 16 executes a predetermined computer program, and thereby the functional elements are implemented. The individual functional elements of the projector 16 operate similarly to the functional elements, having the same name, of the MFP 15. However, as for the projector 16, the display processing portion 402 sends, to a projector mechanism 62, screen data created based on settings indicated in display settings information D16, so that the electronic document 9 is displayed on the screen 17. The document obtaining portion 405 performs communication with the MFP 15 or another external device through a communication interface 63. The display setting portion 406 determines, based on the default information D16A, display settings information D16 to be applied at the start of the display if no browsing ticket C9 is added to the display target electronic document 9, or, alternatively, if an added browsing ticket C9 does not contain any settings in the particular items 61.

As discussed above, with the document display system 1, display settings information indicating the updated display settings during a period when the first document display device displays an electronic document is sent to the second document display device together with the electronic document. Then, in the second document display device, settings for at least common settings indicated in the display settings information are incorporated into display settings at the start of display of the electronic document. Thereby, a user who uses the second document display device to view the electronic document is able to view the electronic document displayed in a manner similar to the previous viewing with the first document display device only by changing display settings for items in which the display settings information is not incorporated.

In the first and second embodiments discussed above, in order to display an electronic document, settings in the common items 20, 60 of the browsing ticket C4, C4b, C5, and C9 have precedence over settings in the common items 20, 60 of the default information D11A, D12A, D15A, and D16A. Accordingly, even if settings in common items applied at the previous display of an electronic document differ from the default settings, the settings in common items applied at the previous display are reproduced at a time when the electronic document is viewed again. This saves a user from having to perform operation for reproducing settings in a case where he/she intends to view the electronic document under settings similar to those applied previously.

In the foregoing first and second embodiments, upon reflecting settings indicated in a browsing ticket into display, even if the browsing ticket does not contain particular items corresponding to the own device, provided that the browsing ticket contains particular items for a device whose specifications for display functions are the same as or similar to those of the own device, such settings may be incorporated into a display. Thereby, display settings applied for browsing each electronic document are automatically shared between document display devices of the same type.

Classification of display settings items into common items and particular items is appropriately performed in accordance with specifications of display functions of document display devices into which a computer program according to the present invention is to be installed. As described above, the particular items may be display settings items common to some of at least three document display devices.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A document display system comprising:
a first document display device; and
a second document display device;
wherein
each of the first document display device and the second document display device includes a memory and one or more processors, the memory storing instructions for the one or more processors to execute:
displaying, on the subject document display device, an electronic document in accordance with display settings for a common item and a particular item, the common item being a predetermined item of a display setting item common to the first document display device and the second document display device, the particular item being a display setting item for the subject document display device except the common item,
updating display settings information indicating latest display settings in response to operation for modifying settings by a user during a period in which the electronic document is displayed, and
in response to a command to externally send out the electronic document, adding the display settings information to the electronic document and sending out the resultant electronic document and the display settings information,
the memory of the first document display device further includes instructions for the one or more processors to execute:
obtaining the electronic document sent out from the second document display device and second display settings information added to the electronic document by the second document display device, and
if display settings indicated in the second display settings information obtained along with the electronic document from the second document display device contain settings for the common item and settings for the particular item previously updated by the first document display device while the electronic document was displayed by the first document display device the last time,
incorporating the settings for the common item and the settings for the particular item contained in the display settings indicated in the second display settings information obtained from the second document display device into display settings to be applied at a start of display of the electronic document on the first document display device.

2. The document display system according to claim 1, wherein the memory of each of the first and second document display devices stores instructions for their respective one or more processors to regard predetermined default settings as display settings to be applied at a start of display of an electronic document to which no display settings information is added.

3. The document display system according to claim 1, wherein the memory of each of the first and second document display devices stores instructions for their respective one or more processors to regard predetermined default settings as settings for the particular item to be applied at a start of display of an electronic document to which display settings information having no settings for the particular item is added.

4. The document display system according to claim 1, wherein, in a state where the display settings for the common item indicated in the display settings information contain font replace, if the display settings for the particular item contain a font, then the display setting portion uses a font indicated in the display settings information as a font at a start of display of the electronic document, and if the display settings for the particular item do not contain a font, then the display setting portion uses a predetermined font indicated in default information.

5. The document display system according to claim 1, wherein, in a state where the display settings for the common item indicated in the display settings information contain letter size optimization, if the display settings for the particular item contain a letter size, then the display setting portion uses a font size indicated in the display settings information as a font size at a start of display of the electronic document, and if the display settings for the particular item do not contain a letter size, then the display setting portion uses a predetermined font size indicated in default information.

6. A document display device for displaying an electronic document, comprising a memory and one or more processors, the memory storing instructions for the one or more processors to execute:
displaying, on the document display device, an electronic document designated as a display target in accordance with display settings for a common item and a particular item, the common item being a display setting item that is defined not to be unique to the document display device, the particular item being a display setting item for the document display device except the common item;
updating display settings information indicating latest display settings in response to operation for modifying settings by a user during a period in which the electronic document is displayed;
in response to a command to externally send out the electronic document, adding the display settings information to the electronic document and sending out the resultant electronic document and the display settings information to an external device;
obtaining the electronic document sent out from the external device and second display settings information added to said electronic document by the external device; and
if display settings indicated in the second display settings information obtained from the external device along with the electronic document contain settings for the common item and settings for the particular item previously updated by the document display device while the electronic document was displayed by the document display device the last time,
incorporating the settings for the common item and the settings for the particular item among the display settings indicated in the second display settings information added to the electronic document obtained from the external device into display settings to be applied at a start of display of said electronic document on the document display device.

7. The document display device according to claim 6, wherein the document display device regards predetermined default settings as display settings to be applied at a start of display of an electronic document to which no display settings information is added.

8. The document display device according to claim 6, wherein the document display device regards predetermined default settings as settings for the particular item to be applied at a start of display of an electronic document to which display settings information having no settings for the particular item is added.

9. The document display system according to claim 6, wherein, in a state where the display settings for the common item indicated in the display settings information contain font replace, if the display settings for the particular item contain a font, then the display setting portion uses a font indicated in the display settings information as a font at a start of display of the electronic document, and if the display settings for the particular item do not contain a font, then the display setting portion uses a predetermined font indicated in default information.

10. The document display device according to claim 6, wherein, in a state where the display settings for the common item indicated in the display settings information contain letter size optimization, if the display settings for the particular item contain a letter size, then the display setting portion uses a font size indicated in the display settings information as a font size at a start of display of the electronic document, and if the display settings for the particular item do not contain a letter size, then the display setting portion uses a predetermined font size indicated in default information.

11. A non-transitory computer-readable storage medium storing thereon a computer program executed in a document display device, the computer program causing a computer included in the document display device to implement:
   display processing for displaying an electronic document designated as a display target in accordance with display settings for a common item and a particular item, the common item being a display setting item that is defined not to be unique to the document display device, the particular item being a display setting item for the document display device except the common item;
   settings update processing for updating display settings information indicating latest display settings in response to operation for modifying settings by a user during a period in which the electronic document is displayed;
   document transmission processing for, in response to a command to externally send out the electronic document, adding the display settings information to the electronic document and sending out the resultant electronic document and the display settings information to an external device;
   document obtaining processing for obtaining electronic document sent out from the external device and second display settings information added to said electronic document by the external device; and
   if display settings indicated in the second display settings information obtained in the document obtaining processing contain settings for the common item and settings for the particular item previously updated by the document display device while the electronic document was displayed by the document display device the last time,
   display setting processing for incorporating settings for the common item and the settings for the particular item among display settings indicated in the second display settings information added to the electronic document obtained in the document obtaining processing into display settings to be applied at a start of display of said electronic document on the document display device.

12. The non-transitory computer-readable storage medium according to claim 11, wherein the computer program further causes a computer included in the document display device to regard predetermined default settings as display settings to be applied at a start of display of an electronic document to which no display settings information is added.

13. The non-transitory computer-readable storage medium according to claim 11, wherein the computer program further causes a computer included in the document display device to regard predetermined default settings as settings for the particular item to be applied at a start of display of an electronic document to which display settings information having no settings for the particular item is added.

14. The non-transitory computer-readable storage medium according to claim 11, wherein the computer program further causes a computer included in the document display device to implement: in a state where the display settings for the common item indicated in the display settings information contain font replace, if the display settings for the particular item contain a font, then the display setting portion uses a font indicated in the display settings information as a font at a start of display of the electronic document, and if the display settings for the particular item do not contain a font, then the display setting portion uses a predetermined font indicated in default information.

15. The non-transitory computer-readable storage medium according to claim 11, wherein the computer program further causes a computer included in the document display device to implement: in a state where the display settings for the common item indicated in the display settings information contain letter size optimization, if the display settings for the particular item contain a letter size, then the display setting portion uses a font size indicated in the display settings information as a font size at a start of display of the electronic document, and if the display settings for the particular item do not contain a letter size, then the display setting portion uses a predetermined font size indicated in default information.

\* \* \* \* \*